Sept. 23, 1952     G. H. COTE     2,611,174
ROTATABLE STOP
Filed April 2, 1946
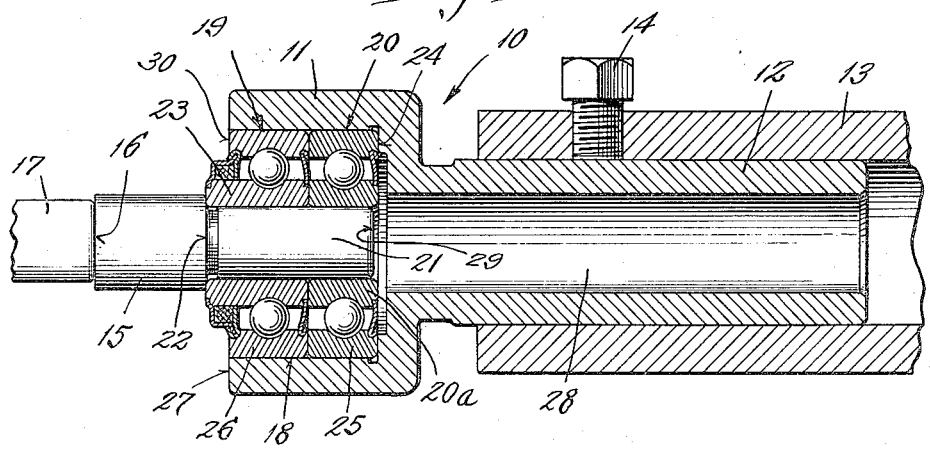
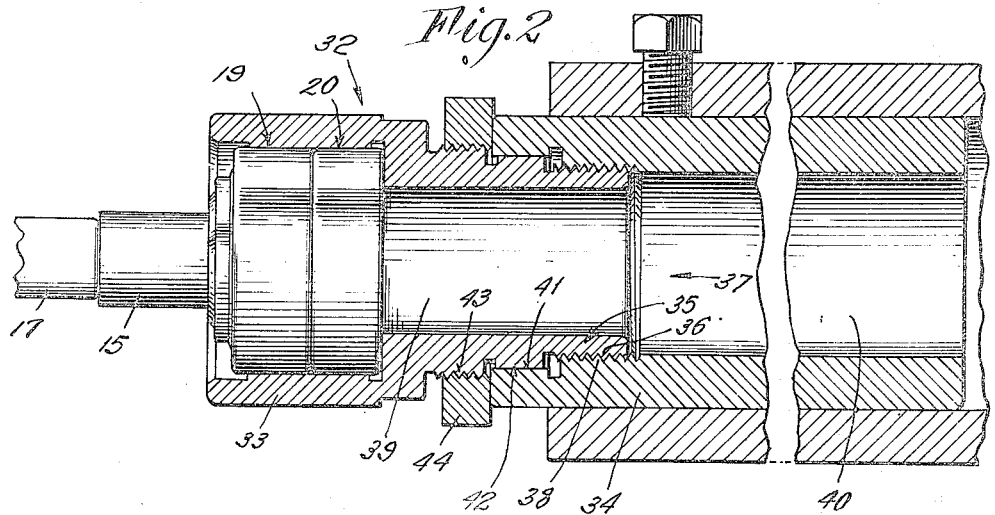
INVENTOR
George H. Cote
BY
Johnson, Kline & Hensel
ATTORNEYS Patented Sept. 23, 1952

2,611,174

UNITED STATES PATENT OFFICE 2,611,174

ROTATABLE STOP

George H. Cote, Bridgeport, Conn.

Application April 2, 1946, Serial No. 658,951

2 Claims. (Cl. 29—58)

This invention relates to work stops for screw machines and the like.

Such stops commonly comprise a shank to be received in and secured to the turret or like part of the machine, and comprise a body portion on the shank, often in the form of a head, for engagement with the workpieces to position the latter. In stops of the rotary type the head is rotatably mounted on the body or the shank so as to be rotatable with the work and prevent abrasion and wear between the latter and the head, which abrasion adversely affects the accuracy of the work.

An object of the present invention is to provide an accurate, simple and economical to manufacture rotary work stop, the various parts of which, including the bearings, may be quickly and conveniently assembled, and disassembled for replacement and other purposes. In the specific embodiments of the invention illustrated herein this is accomplished by the provision of a supporting structure to be secured in the machine, the said structure having a through bore, and mounting in said bore a bearing and also a rotatable head engaged with the bearing. The structures are so organized and arranged that a tool may be inserted through the bore into the supporting structure from the rear thereof, so as to engage and drive the bearing from its seat in the structure, and this construction makes possible an economical frictional holding or press fitting of the parts, resulting in quick and easy assembly and disassembly. The head, which receives the impact from the advancing work in the machine and rotates with the work is so arranged that it may also be frictionally retained, and may be removed from the supporting structure by the removal of the bearing, or may be removed separately from the bearing by the use of the tool inserted into the bore of the structure.

In rotary work stops of the micrometer-adjustment type, the body or work-engaging part of the stop is adjustably mounted on the shank so that it may be precisely advanced or retracted with respect to the latter, and therefore with respect to the turret of the machine.

Another object of the invention is to provide for screw machines, lathes and the like, a precise, and accurate, micrometer-adjustment type of work stop of economical and simple manufacture. In accomplishing this, the shank and the body or work-engaging member of the stop, which parts have cooperable threads for effecting the precise advancing and retracting relative movement, are provided with accurate cooperable auxiliary surfaces which bear on each other and maintain the parts in accurate alignment at all times, and particularly in the adjusted and locked settings of the parts. As a result, the work-engaging part of the stop is at all times accurately aligned with the work, even when subsequent advancing or retracting adjustment of the stop is made, and therefore the accuracy of the work is not impaired.

A further object of the invention is to provide a micrometer-adjustment type of rotary work stop of simple and economical construction, high precision, and quick and easy assembly and disassembly of the parts including the bearings. This is accomplished by providing a relatively adjustable shank and head-carrying body having cooperable auxiliary aligning surfaces, the said surfaces being so located that both the head and body may have large-diameter, through communicating bores to enable insertion of a tool into the shank for engagement with the bearing and/or head to dislodge and remove the same.

Other features and advantages will hereinafter appear.

In the accompanying drawings:

Fig. 1 is an axial section through a rotary work stop illustrating an embodiment of the invention, and Fig. 2 is an axial section through an adjustable rotary work stop illustrating another embodiment of the invention.

Referring to Fig. 1, the work stop shown comprises a supporting member 10 having a generally cylindrical body portion 11 and a shank 12. The body 11 is mounted or supported in place by inserting the shank 12 in a suitable part 13 of the machine, such part comprising the turret, tail stock, or other supporting means. The shank 12 may be locked in any of a number of adjusted positions in the machine turret 13 by means of a locking screw 14 threaded into the turret and bearing on the outer surface of the shank.

Supported in the body 11 of the stop is a rotatable head or work-engaging member 15 having a face 16 for engagement with advancing work 17, to halt the advancing movement of and to position the latter.

According to the present invention an extremely simple and accurate, economical means is provided for rotatably mounting the head 15 in the body 11, the organization of the said means and the supporting member 10 being such that quick, low cost assembly of the parts is had, and also quick and easy disassembly of the parts is possible when this is desired for replacement or other purposes.

As shown, the body 11 of the supporting member is provided with a circular bore or recess 18 which is accurately formed and held to close tolerances, and is located to be concentric with respect to the exterior surface of the shank 12. Anti-friction bearing means comprising a pair of bearing assemblies 19 and 20 having identical outside diameters are mounted in the bore 18 of the body 11 to be frictionally retained therein, the assemblies being press-fitted in the said body. The inside diameters or bores of the bearing assemblies 19 and 20 are also of identical diameter and are perfectly aligned with each other, and the rotatable head 15 of the stop has a cylindrical shank 21 which is press-fitted into the bearing assemblies so as to be securely retained therein against accidental dislodgement.

For the purpose of positioning the head 15 with respect to the bearing assemblies 19 and 20, a shoulder 22 is provided between the head 15 and the shank 21, the said shoulder abutting the exterior edge of the inner member 23 of the bearing assembly 19. Similarly, the body 11 has an internal shoulder 24 for engaging the edge of the exterior member 25 of the bearing assembly 20. When the bearing assemblies 19 and 20 are press-fitted into the body 11 the inner and outer members of the assemblies will abut each other as shown, and the outer edge of the exterior member 26 of the bearing assembly 19 may fit flush with the end surface 27 of the body 11.

According to this organization an extremely accurate and economical construction is provided, since the bearing assemblies 19 and 20 may be standard items such as are produced in great quantities and are available at economical prices, and since the assembly of the various parts involves press-fitting operations which may be quickly done, thereby reducing labor costs.

Further, according to the present invention, the shank 12 of the stop is provided with a central through bore 28 which communicates with the bore or recess 18 of the body 11, the bore 28 being of larger diameter than the bore of the bearing assembly 20 so that the inner member 20a of the latter projects inwardly with respect to the bore 28. By this construction, when it is desired to disassemble the parts of the work stop this may be quickly and conveniently accomplished by inserting a tool into the bore of the shank 13 from the rear thereof so that the tool engages the bearing assembly 20. By applying force to the tool it will drive the assembly 20, and with it the assembly 19 from the body 11. During this operation the head 15 will remain frictionally held by the bearing assemblies 19 and 20, and subsequent to removal of these from the body 11 the shank 21 of the head 15 may be driven out of the assemblies by another tool. Or, if desired, the shank 21 of the head may be driven out of the bearing assemblies 19 and 20 while the latter are still retained in the body 11 of the stop. To accomplish this, a tool is inserted into the bore 28 of the shank 12 so as to engage the end 29 of the shank 21, and the work stop is positioned on an anvil having an opening through which the head 15 extends, and having a supporting surface for engagement with the end surface 30 of the exterior member 26 of the bearing assembly 19.

Preferably the bearing assembly 20 is of the grease retaining type, and the bearing assembly 19 is of the sealing and grease retaining type, the seal being located on the outer portion of the assembly so as to exclude all dirt and other foreign matter therefrom. By the provision of the sealed bearing assembly 19, press-fitted into the body 11 and having the shank 21 of the head press-fitted into its bore, the interiors of the body 11 and the bearing assemblies are tightly sealed at the forward end of the work stop, and chips, coolant and other matter which might be thrown against the face of the stop will not have access to the interior thereof.

A rotary adjustable type work stop embodying the invention is illustrated in Fig. 2. This stop comprises a supporting structure 32 having a cylindrical body portion 33 adjustably mounted on the end of a shank portion 34. The body portion 33 carries press-fitted bearing assemblies 19 and 20 which rotatably mount a press-fitted work-engaging head 15.

The body portion 33 has a rearward extension 35 provided with external threads 36, the said extension extending into a recess 37 of the shank 34, and the threads 36 engaging threads 38 within the said recess, thereby to enable the body portion to be precisely advanced or retracted with respect to the shank portion 34.

According to the present invention the extension 35 and shank 34 are provided with aligned bores 39 and 40 respectively to admit a tool for driving out the bearing assemblies 19 and 20, and the said extension and shank are further provided with accurately located cooperable aligning surfaces 41 and 42 for maintaining the body 33 in accurate alignment when in different adjusted positions on the shank 34. A close running fit is provided between the surfaces 41 and 42, and the said surfaces are accurately located to be concentric with the exterior of the shank 34 and with the inside diameter of the body 33. The surfaces 41 and 42 thus serve to maintain the alignment of the body 33 on the shank 34 at all times, and obviate the necessity of holding the threads 36 and 38 to close tolerances, since these threads now serve merely to advance and retract the body, and do not have any major aligning function.

The extension 35 of the body 33 has a second set of threads 43 located exteriorly of the shank 34, the said threads carrying a nut 44 by means of which the body 33 may be locked in its adjusted positions.

Variations and modifications may be made within the scope of this invention and portions of the improvements may be used without others.

I claim:

1. An adjustable work stop for a screw machine, lathe or the like, comprising a shank to be secured to the machine, said shank having a bore and having screw threads in the bore, a portion of the walls of the bore spaced from said screw threads comprising a precisely finished longitudinally extending cylindrical supporting surface; a body carried by the shank, having means for engaging and positioning work handled by the machine, the said body having a threaded portion extending into the bore of the shank and engaging the threads thereof to enable precise advancing and retracting movement of the body with respect to the shank, and having an elongated precisely finished cylindrical surface engaging the supporting surface of said shank in a close running fit to hold the latter and the body in alignment in various adjusted positions thereof, said cylindrical surface being of larger internal diameter than the external diameter of said supporting surface at all times; threads on said body, located exteriorly of the shank and on the opposite side of said surface from the first-mentioned threads; and a nut carried by the exterior threads of the body, for engaging the shank and locking the latter and body together in relative adjusted positions.

2. An adjustable rotary work stop for a screw machine, lathe or the like, comprising a shank to be secured to the machine, said shank having a through bore, and a portion of the shank having screw threads and having a spaced precisely finished cylindrical supporting surface; a body carried by the shank, having a through bore communicating with the bore of the shank, said body having screw threads engaging the threads of the shank to enable precise advancing and retracting movement of the body with respect to the shank, and having a precisely finished cylindrical surface engaging the supporting surface of the shank in a close running fit to hold the latter and said body in accurate alignment during adjustments thereof, said cylindrical surface being of larger internal diameter than the external diameter of said supporting surface at all times; means for locking the body and shank together in relative adjusted positions; a bearing carried in the bore of the body having a smaller internal diameter than the internal diameter of the through bore in the shank; and a rotatable work-engaging head positioned in the bore of the body and engaging the said bearing, the communicating through bores of the body and shank enabling a tool to be inserted into the shank for engaging and pushing the bearing from the body without disturbing the adjustment between the body and shank.

GEORGE H. COTE.

REFERENCES CITED

The following references are of record in the file of this patent:

UNITED STATES PATENTS

| Number | Name | Date |
| --- | --- | --- |
| 619,821 | Bray | Feb. 21, 1899 |
| 1,393,057 | Vollmer | Oct. 11, 1921 |
| 1,467,304 | Bosshard | Sept. 11, 1923 |
| 1,524,778 | Brown | Feb. 3, 1925 |
| 1,554,709 | Brown | Sept. 22, 1925 |
| 2,091,864 | Kline | Aug. 31, 1937 |
| 2,142,639 | Fish | Jan. 3, 1939 |
| 2,349,159 | Freeman | May 16, 1944 |

FOREIGN PATENTS

| Number | Country | Date |
| --- | --- | --- |
| 74,700 | Sweden | July 5, 1932 |